March 30, 1926.

P. M. HALL ET AL

METHOD OF REMOVING THE BURR FORMED IN WELDING

Filed Sept. 4, 1924

1,578,658

Inventors
Preston Martin Hall & Wolcott Remington
By his Attorneys Townsend + Decker Patented Mar. 30, 1926.

1,578,658

UNITED STATES PATENT OFFICE.

PRESTON MARTIN HALL, OF WORCESTER, AND WOLCOTT REMINGTON, OF SWAMP-SCOTT, MASSACHUSETTS, ASSIGNORS TO THOMSON ELECTRIC WELDING COMPANY, OF LYNN, MASSACHUSETTS, A CORPORATION OF MASSACHUSETTS.

METHOD OF REMOVING THE BURR FORMED IN WELDING.

Application filed September 4, 1924. Serial No. 735,765.

*To all whom it may concern:*

Be it known that we, PRESTON MARTIN HALL and WOLCOTT REMINGTON, citizens of the United States, and residents of Worcester, in the county of Worcester and State of Massachusetts, and Swampscott, in the county of Essex and State of Massachusetts, respectively, have invented certain new and useful Improvements in Methods of Removing the Burr Formed in Welding, of which the following is a specification.

Our invention relates to an improved method of and apparatus for removing the upset enlargement formed in an electric welding or other welding operation.

The invention is especially useful in electric welding operations and particularly in butt-welding, for which reason it will be described as carried out in that specific method of welding known as the electric resistance method wherein the parts are brought into contact and heated by the passage of the current after which, on the attainment of the welding temperature, they are forced together to form a weld with the usual attendant enlargement formed of upset metal.

Heretofore various expedients have been resorted to for effectually removing the upset metal or for smoothing it down, none of which have been satisfactory because of expense or because the excess metal which deforms the product is not thoroughly removed.

Our present invention consists essentially in directing upon the heated upset metal air or other combustion promoting gas or fluid in amount sufficient to consume or burn away the heated burr or upset. The stream of oxygen containing gas such as air or other gas serving to unite with the heated material and burn the same away may be applied in any desired way through nozzles, pipes or orifices in the clamping and welding devices by which the gas in sufficient amount to promote combustion applied for a sufficient time to entirely consume the heated upset may be applied and directed upon it. Conveniently, in the case of a butt-welding machine for instance, the gas conducting and directing passages may be formed in the welding clamps.

Figure 1:
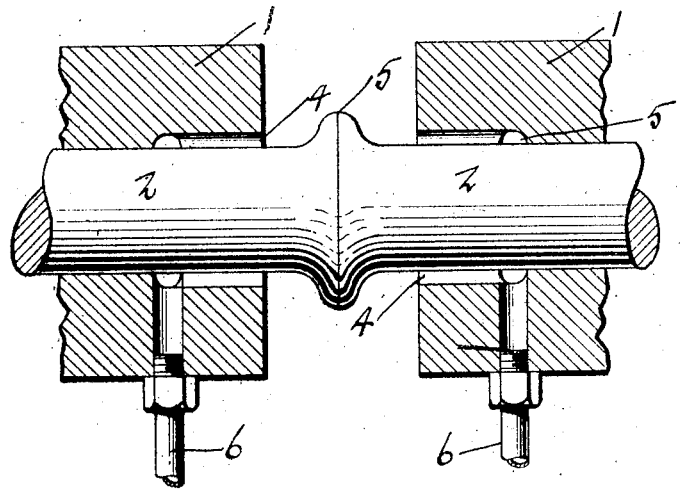
Figure 2:
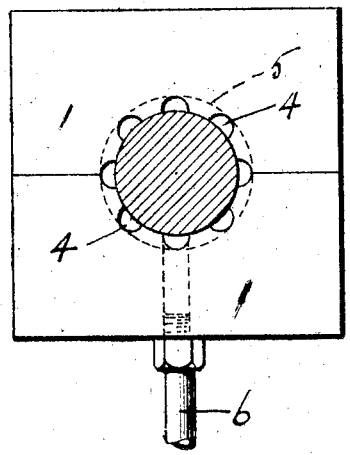

In the drawings we have shown in vertical section a typical construction adapted to the carrying on of the process, the parts being shown in Fig. 1 in cross-section while in Fig. 2 one of the welding clamps is shown in end view looking from a point between the two clamps.

1 indicates clamps for holding a bar, rod or pipe of metal as usual in the welding art and for supplying the heating or welding current to the bars, rods or other work 2 secured in said clamps. The means for supplying pressure to the bars or rods 2 that are to be welded together are of any proper construction and it is not necessary to describe them as they are well known in the art.

At 3 is indicated the usual upset formed by the application of end pressure to the heated section of work. In the case of a solid bar said upset appears only on the exterior of the work but in the case of a tube it would appear also upon the inside of the tube.

To remove this enlargement is the object of our invention, accomplished in the present illustration of the same by providing one or both of the welding clamps with passageways 4 terminating in the face of the clamp and connected with a supply passageway 5 into which the air or other aid to the burning or combustion and consumption of the metal is introduced from supply pipe 6 in any desired way. The orifices in the face of each clamp are sufficient in number and are so disposed as to direct the blast of air or other gas directly upon the heated or incandescent metal heated by the electric current passed through the joint and extruded as a burr by the application of the welding pressure. Preferably said blast in the case of the welding of two pieces of metal together end to end is applied in a manner to substantially encircle the joint. Said air or gas is supplied in sufficient amount and for a sufficient length of time to secure a complete burning away or consumption of the heated metal of the enlargement as preferably fast as it forms or in other words simultaneously with the application of the welding pressure or at the time of the formation of the welded joint, the heating being continued if necessary after the weld is completed in order to keep up the temperature and insure the complete consumption of the enlargement.

Obviously the nature of the combustion-aiding gas will depend upon the nature of the metal. In some cases a blast of oxygen gas might be employed or in other cases a gas such as chlorine might be used. In the case of a tube the enlargement within the same can be removed in the same manner by supplying the air or other gas to the interior of the tube to burn away the upset metal during or after the weld is formed.

We are aware that it has been before proposed to blow or sweep away by the mechanical action of a current or blast of air, molten or scintillating particles of metal produced by an initial sparking contact at the opposed ends of the work and also the overheated metal or metal reduced to a fluid state and extruded by the welding pressure. Our invention differs from such prior practice in that the operation is conducted upon the heated metal which has been brought to a welding temperature which being upset or displaced sidewise in the production of the weld, would form an enlargement or bulge around the place of welding. In the previous process the operation is mechanical and is applied only to such portion of the metal as is reduced to a fluid state and is not involved in the weld, while by our invention we remove that portion of the metal which is brought to welding temperature or in other words is plastic only and as a result of its plasticity is upset or displaced sidewise and would remain as an enlargement of the welded joint.

What we claim as our invention is:—

1. The herein described improvement in electric butt welding consisting in removing the upset or burr formed by the welding pressure while said burr is in the heated condition due to the heat applied to the joint to bring the metal up to welding temperature, by directing a burr removing stream or blast of combustion-aiding fluid onto said burr to remove the same while so heated.

2. The method of preventing the formation of a burr in an electric butt-welding operation consisting in directing upon the heated metal of the burr simultaneously with the application of the welding pressure, a stream or blast of combustion-aiding fluid in amount sufficient to consume or burn away the upset.

3. The method of removing the upset formed in an electric butt-welding operation consisting in applying a stream or blast of a combustion-aiding fluid surrounding the work and directed upon the heated metal of the upset during its formation and in amount sufficient to consume or burn away said upset.

Signed at Lynn in the county of Essex and State of Mass. this 20th day of August A. D. 1924.

PRESTON MARTIN HALL.
WOLCOTT REMINGTON.